US012142838B2

(12) United States Patent
Cao et al.

(10) Patent No.: US 12,142,838 B2
(45) Date of Patent: Nov. 12, 2024

(54) PHASED-ARRAY ANTENNA, DISPLAY PANEL, AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Xue Cao, Beijing (CN); Tien-Lun Ting, Beijing (CN); Jie Wu, Beijing (CN); Ying Wang, Beijing (CN); Chuncheng Che, Beijing (CN); Hailin Xue, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 1298 days.

(21) Appl. No.: 16/641,933

(22) PCT Filed: Dec. 13, 2018

(86) PCT No.: PCT/CN2018/120833
§ 371 (c)(1),
(2) Date: Feb. 25, 2020

(87) PCT Pub. No.: WO2019/134488
PCT Pub. Date: Jul. 11, 2019

(65) Prior Publication Data
US 2020/0266553 A1 Aug. 20, 2020
US 2021/0265744 A9 Aug. 26, 2021

(30) Foreign Application Priority Data
Jan. 5, 2018 (CN) .......................... 201810009872.2

(51) Int. Cl.
H01Q 21/22 (2006.01)
G02F 1/1333 (2006.01)
(Continued)

(52) U.S. Cl.
CPC .......... H01Q 21/22 (2013.01); G02F 1/1333 (2013.01); H01Q 1/38 (2013.01); H01Q 21/065 (2013.01)

(58) Field of Classification Search
CPC ................................ H01Q 21/22; H01Q 1/38
See application file for complete search history.

(56) References Cited

U.S. PATENT DOCUMENTS 6,538,603 B1 * 3/2003 Chen ........................ H01Q 3/36
342/372
2009/0278744 A1 11/2009 Kirino et al.
(Continued)

FOREIGN PATENT DOCUMENTS

CN 202735999 U 2/2013
CN 103326115 A 9/2013
(Continued)

OTHER PUBLICATIONS

European Extended Search Report, Application No. 18898214.4, dated Sep. 16, 2021, 8 pps.
(Continued)

Primary Examiner — Peguy Jean Pierre
(74) Attorney, Agent, or Firm — Armstrong Teasdale LLP

(57) ABSTRACT

Embodiments of the present disclosure relate to a phased-array antenna, a display panel, and a display device. The phased-array antenna includes a first substrate and a second substrate arranged oppositely, and a plurality of phased-array elements located between the first substrate and the second substrate. At least one of the phased-array elements includes a first electrode, a second electrode arranged oppo-
(Continued)

site to the first electrode, a voltage-controlled phase shift material located between the first electrode and the second electrode, wherein the first electrode is configured to receive a bias signal for controlling the voltage-controlled phase shift material, and the second electrode serves as a ground electrode, and a microstrip line located at a side of the first electrode far away from the voltage-controlled phase shift material and electrically insulated from the first electrode, wherein the microstrip line is configured to receive or transmit a transmission signal.

20 Claims, 6 Drawing Sheets

(51) Int. Cl.
*H01Q 1/38* (2006.01)
*H01Q 21/06* (2006.01)

(56) References Cited

U.S. PATENT DOCUMENTS

| | | |
|---|---|---|
| 2014/0266897 A1 | 9/2014 | Jakoby et al. |
| 2017/0301475 A1 | 10/2017 | Stevenson et al. |

FOREIGN PATENT DOCUMENTS

| | | | |
|---|---|---|---|
| CN | 103560324 | A | 2/2014 |
| CN | 103956579 | A | 7/2014 |
| CN | 102830850 | B | 8/2015 |
| CN | 1105552535 | A | 5/2016 |
| CN | 106532200 | A | 3/2017 |
| CN | 106684551 | A | 5/2017 |
| CN | 106896549 | A | 6/2017 |
| CN | 206388860 | U | 8/2017 |
| CN | 107453013 | A | 12/2017 |
| CN | 107528121 | A | 12/2017 |
| EP | 3745526 | * 12/2020 | ................ H01P 1/18 |
| JP | 2001119204 | A | 4/2001 |
| JP | 2009538565 | A | 11/2009 |
| JP | 2014531843 | A | 11/2014 |
| JP | 2017111384 | A | 6/2017 |
| KR | 1020140090165 | A | 7/2014 |
| TW | 201135316 | A | 10/2011 |
| WO | 2007043590 | A1 | 4/2007 |
| WO | 2017208996 | A1 | 12/2017 |

OTHER PUBLICATIONS

Korean Notification of Reason for Refusal, Application No. 1020207018735, dated Nov. 28, 2021, 14 pps.: with English translation.
European First Office Action, Application No. 18898214.4, dated Sep. 13, 2023, 8 pps.
JP Notice of Reasons for Refusal, Application No. 2020-533626, dated Dec. 21, 2022, 8 pps.: with English Translation.
PCT International Search Report, Application No. PCT/CN2018/120833, dated Feb. 27, 2019, 5 pages: with English translation.
PCT Written Opinion, Application No. PCT/CN2018/120833, dated Feb. 27, 2019, 7 pages.: with English translation of relevant part.
China First Office Action, Application No. 201810009872.2, dated Dec. 2, 2019, 19 pps.: with English translation.
China Notification to Grant, Application No. 201810009872.2, dated Apr. 9, 2020, 7 pps.: with English translation.

* cited by examiner

PHASED-ARRAY ANTENNA, DISPLAY PANEL, AND DISPLAY DEVICE

CROSS REFERENCE TO RELATED APPLICATIONS

This patent application is a National Stage Entry of PCT/CN2018/120833 filed on Dec. 13, 2018, which claims the benefit and priority of Chinese Patent Application No. 201810009872.2 filed on Jan. 5, 2018, the disclosures of which are incorporated by reference herein in their entirety as part of the present application.

BACKGROUND

Embodiments of the present disclosure relate to the field of antenna technologies, and more particularly, to a phased-array antenna, a display panel including the phased-array antenna, and a display device.

Phased-array antenna is an antenna that changes the shape of directional pattern by controlling feeding phase of a radiating element in the array antenna. Controlling the phase may change the direction of the maximum of the antenna directional pattern to achieve beam scanning. The phased-array antennas have a wide range of applications. For example, the phased-array antennas may be used in communication between vehicles and satellites, array radars for autonomous driving, or array radars for safeguard, etc.

Microstrip lines are structures frequently used in the phased-array antennas. Generally, signals transmitted in the microstrip lines include high-frequency transmission signals and low-frequency bias signals (for example, bias voltages). The high-frequency transmission signals may be transmitted among respective phased-array element, and the bias signals of each antenna element need to be separately controlled.

BRIEF DESCRIPTION

Embodiments of the present disclosure provide a phased-array antenna, a display panel, and a display device.

One aspect of the present disclosure provides a phased-array antenna. The phased-array antenna may include a first substrate and a second substrate arranged oppositely each other, and a plurality of phased-array elements located between the first substrate and the second substrate. In some embodiments of the present disclosure, at least one of the phased-array elements may include a first electrode, a second electrode arranged opposite to the first electrode, a voltage-controlled phase shift material located between the first electrode and the second electrode, wherein the first electrode is configured to receive a bias signal for controlling the voltage-controlled phase shift material, and the second electrode serves as a ground electrode, and a microstrip line located at a side of the first electrode far away from the voltage-controlled phase shift material and electrically insulated from the first electrode, wherein the microstrip line is configured to receive or transmit a transmission signal.

In some embodiments of the present disclosure, a thickness of the first electrode is greater than about 0.01 µm and less than about 0.5 µm.

In some embodiments of the present disclosure, an orthographic projection of the microstrip line on the first substrate overlaps an orthographic projection of the first electrode on the first substrate.

In some embodiments of the present disclosure, the first electrodes of different phased-array elements are electrically isolated.

In some embodiments of the present disclosure, each of the phased-array elements may further include an insulation layer located between the microstrip line and the first electrode. The insulation layers corresponding to different phased-array elements are formed integrally.

In some embodiments of the present disclosure, the first electrode and the microstrip may have, for example, a spiral or snakelike shape.

In some embodiments of the present disclosure, the second electrode may include a block electrode.

In some embodiments of the present disclosure, the second electrodes of different phased-array elements may be formed integrally.

In some embodiments of the present disclosure, the phased-array antenna may further include a feed interface configured to transmit the transmission signal, and a power divider configured to couple the feed interface to the microstrip line of the respective phased-array element.

In some embodiments of the present disclosure, the power divider and the microstrip line may be arranged in a same layer.

In some embodiments of the present disclosure, the phased-array antenna may further include a pin located in a peripheral region of the phased array and a wiring coupling the pin to the first electrode.

In some embodiments of the present disclosure, the pin, the wiring, and the first electrode may be arranged in a same layer.

In some embodiments of the present disclosure, the voltage-controlled phase shift material may include, for example, a liquid crystal material.

In some embodiments of the present disclosure, the phased-array antenna may further include a first alignment layer located on a side of the first electrode close to the voltage-controlled phase shift material, and a second alignment layer located on a side of the second electrode close to the voltage-controlled phase shift material.

In some embodiments of the present disclosure, a material of the first electrode may include, for example, metal or metal oxide.

In some embodiments of the present disclosure, a material of the microstrip line may include metal.

A second aspect of the present disclosure provides a display panel. The display panel may include the phased-array antenna in one or more embodiments referring to the phased-array antenna of the present disclosure.

In some embodiments of the present disclosure, the phased-array antenna may be located in a peripheral region of the display panel.

In some embodiments of the present disclosure, the display panel may include a liquid crystal display panel having a color filter substrate and an array substrate. The first substrate may be one of the color filter substrate and the array substrate, and the second substrate may be the other of the color filter substrate and the array substrate.

A third aspect of the present disclosure provides a display device. The display device may include the display panel in one or more embodiments referring to the display panel of the present disclosure.

Further adaptive aspects and ranges are apparent from the description provided herein. It is to be understood that various aspects of the present disclosure may be implemented individually or in combination with one or more other aspects. It is also to be understood that the description and specific embodiments herein are for the purpose of illustration only and are not intended to limit the scope of the present disclosure.

BRIEF DESCRIPTION OF THE DRAWINGS

The accompanying drawings set forth herein are merely for the purpose of describing the selected embodiments, are not all possible implementations and are not intended to limit the scope of the present disclosure, in which.

Throughout various views of these accompanying drawings, corresponding reference numbers indicate corresponding parts or features.

DETAILED DESCRIPTION

Various embodiments will now be described in detail with reference to the accompanying drawings, which are provided as exemplary examples of the present disclosure, so as to enable those skilled in the art to implement the present disclosure.

Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components will be omitted so as not to obscure the present disclosure. Further, various embodiments encompass present and future known equivalents to the components referred to herein by way of illustration.

As used herein, the terms "have", "comprise" and "contain" as well as grammatical variations thereof are used in a non-exclusive way. Thus, the expression "A has B" as well as the expression "A comprises B" or "A contains B" may both refer to the fact that, besides B, A contains one or more further components and/or constituents, and to the case that, besides B, no other components, constituents or elements are present in A.

For the purpose of description hereinafter, as direction-calibrated in the accompanying drawings, the terms "above", "below", "left", "right", "vertical", "horizontal", "top", "bottom" and derivatives thereof shall relate to the present disclosure. The terms "covered with", "on top of", "positioned on", or "positioned on top of" mean that, for example, a first element of a first structure is on a second element of a second structure, wherein an intermediate element such as an interface structure may exist between the first element and the second element. The term "direct contact" means that, such as, the first element of the first structure and the second element of the second structure are connected without any intermediary conducting, insulating or semiconductor layers at the interface of the two elements.

As used herein and in the appended claims, the singular form of a word includes the plural, and vice versa, unless the context clearly dictates otherwise. Thus, singular words are generally inclusive of the plurals of the respective terms.

Figure 1A:
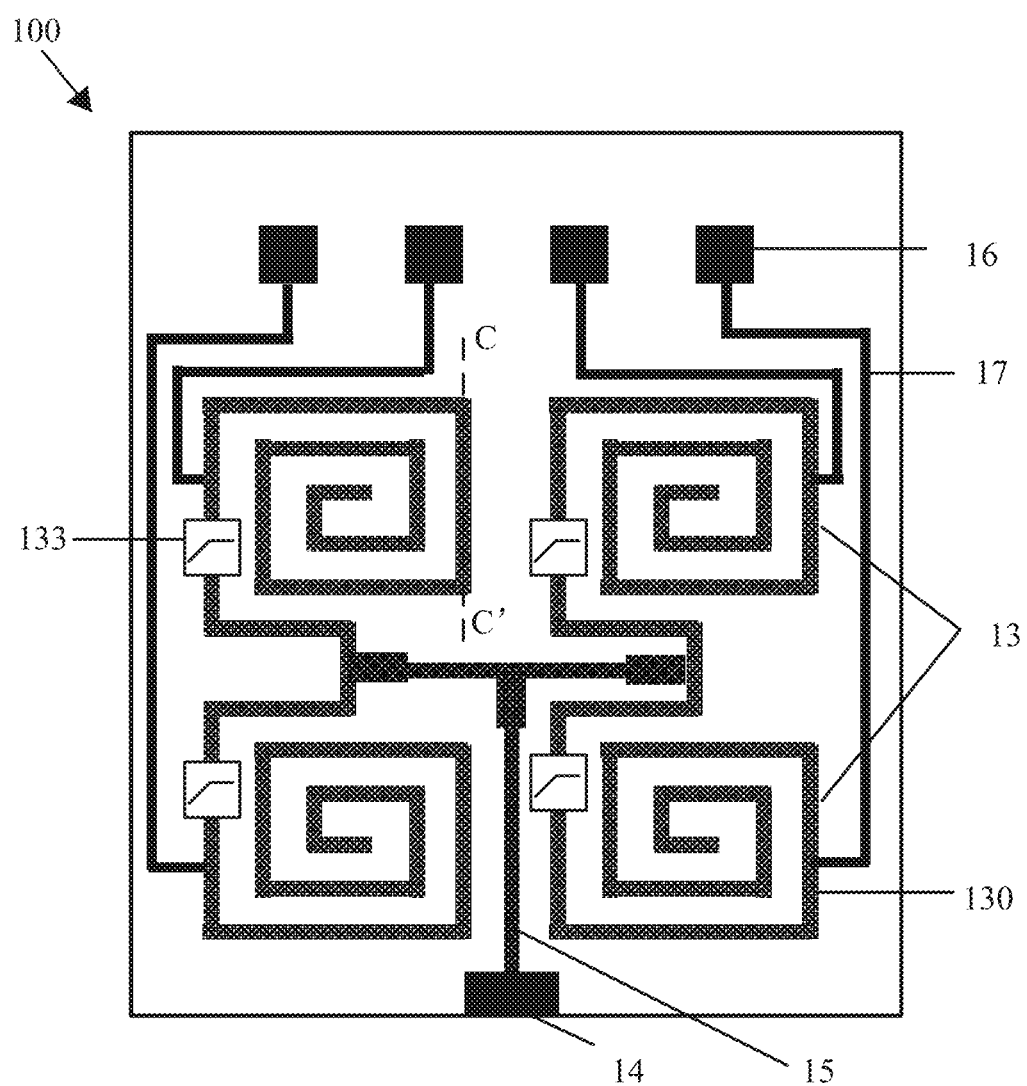
FIG. 1A schematically illustrates an arrangement of a microstrip line of a phased-array antenna.
Figure 1B:
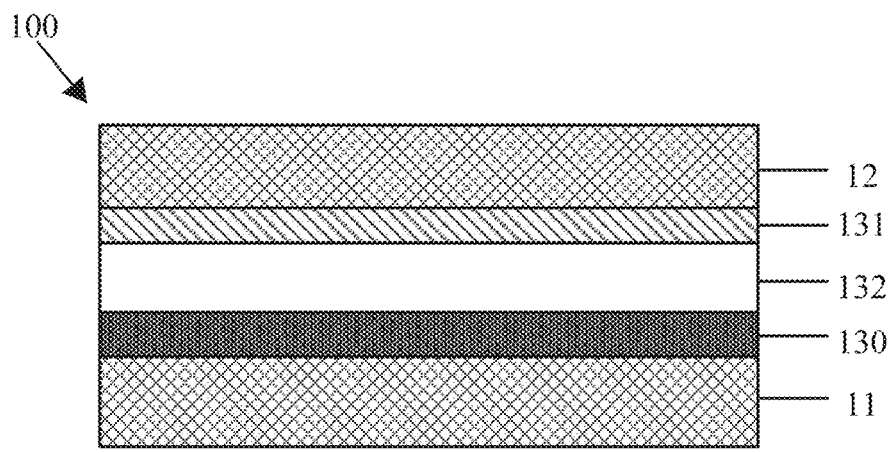
FIG. 1B schematically illustrates a sectional view of the phased-array antenna in FIG. 1A along Line CC'.

FIG. 1A schematically illustrates an arrangement of a microstrip line of a phased-array antenna 100, and FIG. 1B schematically illustrates a sectional view of the phased-array antenna 100 in FIG. 1A along Line CC'. As shown in FIG. 1A and FIG. 1B, the phased-array antenna 100 may include a first substrate 11, a second substrate 12, a plurality of phased-array elements 13, a feed interface 14, a power divider 15, a pin 16, and a wiring 17. At least one of the phased-array elements 13 may include a microstrip line 130, a ground electrode 131 arranged opposite to the microstrip line 130, and a voltage-controlled phase shift material 132 located between the microstrip line 130 and the ground electrode 131.

A high-frequency transmission signal may be inputted into the power divider 15 through the feeder interface 14, and then may be inputted into each phased-array element 13 through the power divider 15. A low-frequency bias signal may be applied to the pin 16 and may be transmitted into the microstrip line 130 via the wiring 17. Both the high-frequency transmission signal and the low-frequency bias signal are transmitted on the microstrip line 130. In order to prevent short-circuit or interference of the bias signals of different phased-array elements 13, a filter 133 is arranged in each of the phased-array elements 13. The filter 133 can block the propagation of the bias signals between the phased-array elements 13, but allow the high-frequency transmission signal to pass through. However, the arrangement of the filter 133 in the phased-array element 13 will cause a certain loss of the high-frequency transmission signal, reducing the antenna gain. In addition, the filter 133 may also occupy, to a certain extent, the space of the phased-array element 13, which is disadvantageous to the integration of the phased-array antenna.

According to an aspect of the present disclosure, a phased-array antenna is disclosed. In the phased-array antenna provided by some embodiments of the present disclosure, an additional first electrode is introduced into each phased-array element, wherein the first electrode is configured to receive a bias signal, for example, a bias voltage; whereas the microstrip line is configured to receive or transmit a transmission signal. With this configuration, it is unnecessary to use a filter in the phased-array element, so loss due to the filter may be reduced, and the antenna gain may be improved.

Figure 2:
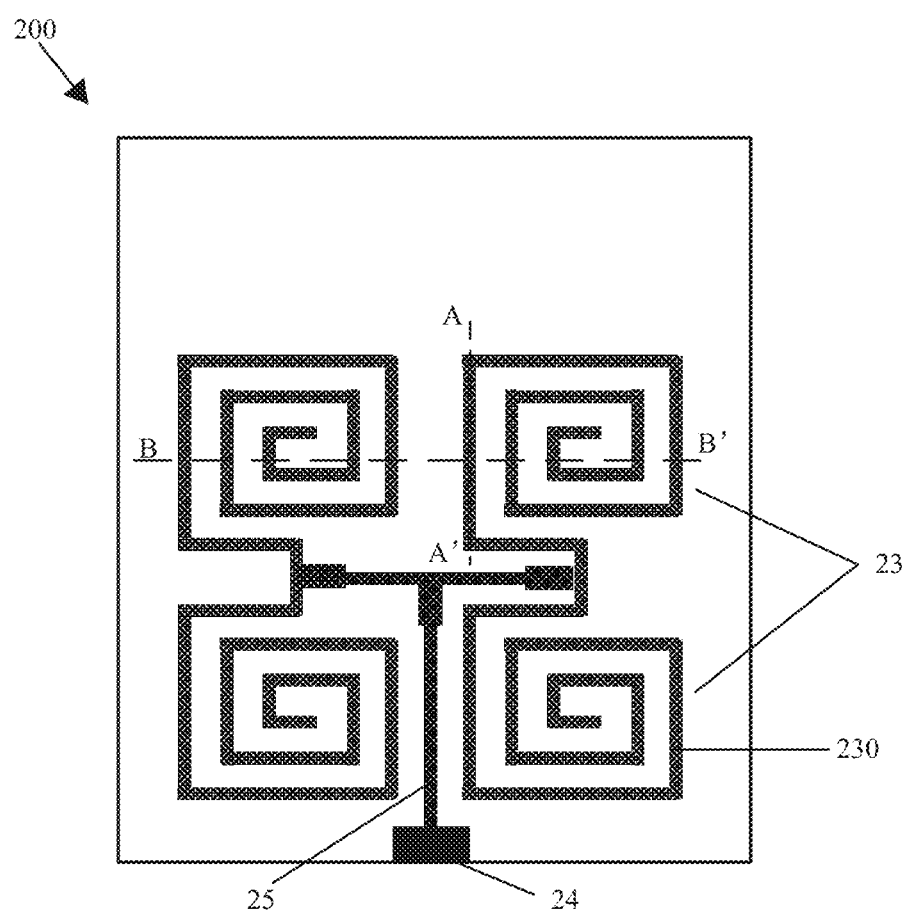
FIG. 2 schematically illustrates an arrangement of a microstrip line of a phased-array antenna according to an embodiment of the present disclosure.
Figure 3:
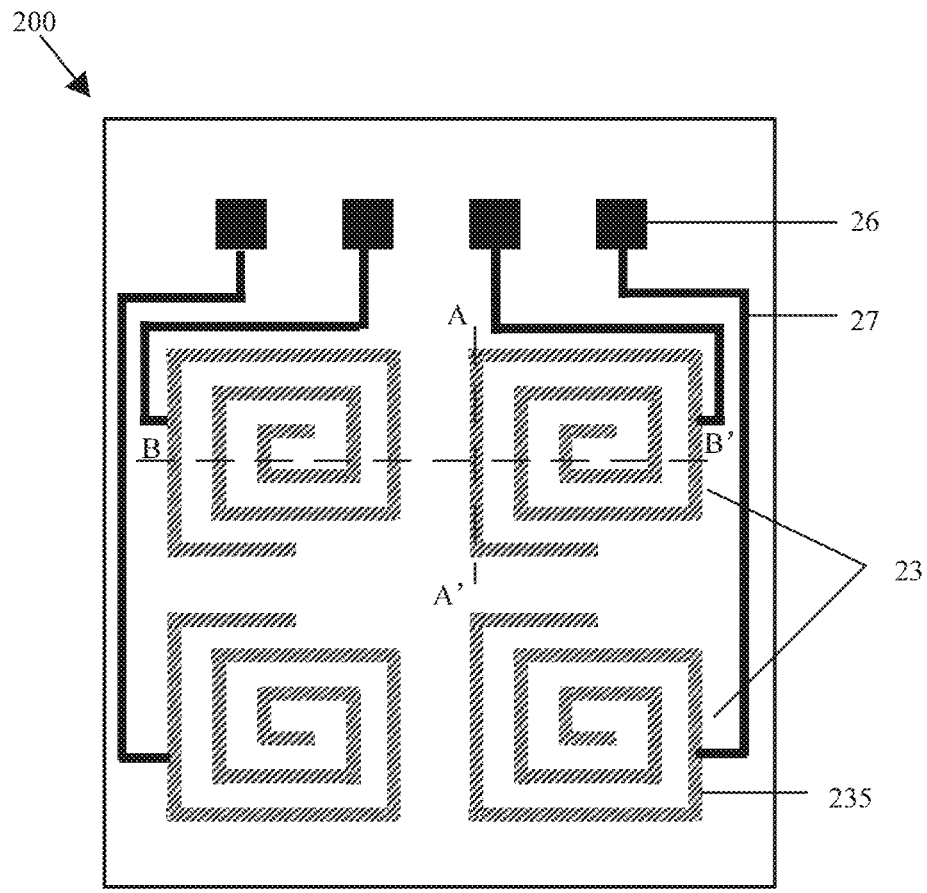
FIG. 3 schematically illustrates an arrangement of a first electrode of a phased-array antenna according to an embodiment of the present disclosure.
Figure 4:
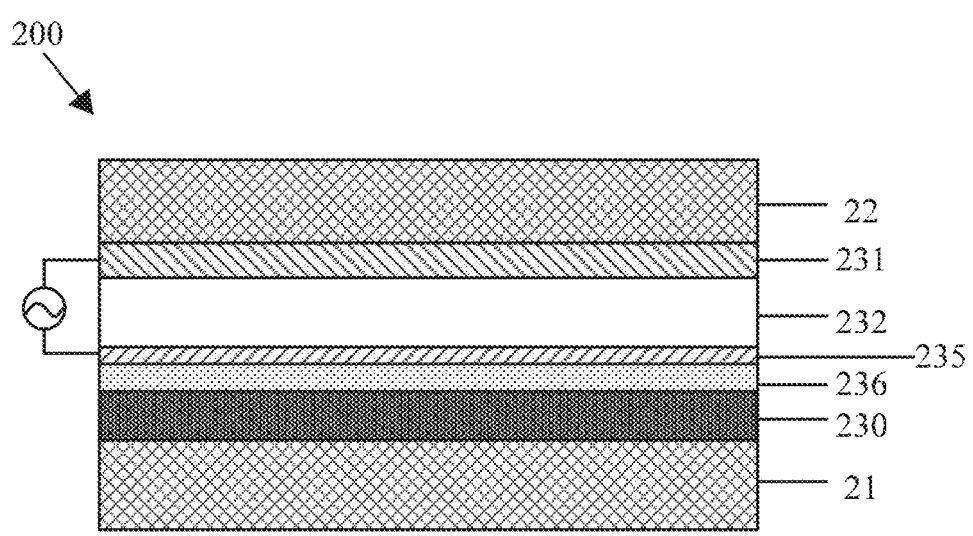
FIG. 4 schematically illustrates a sectional view of the phased-array antenna along Line AA' in FIG. 3 according to an embodiment of the present disclosure.
Figure 5:
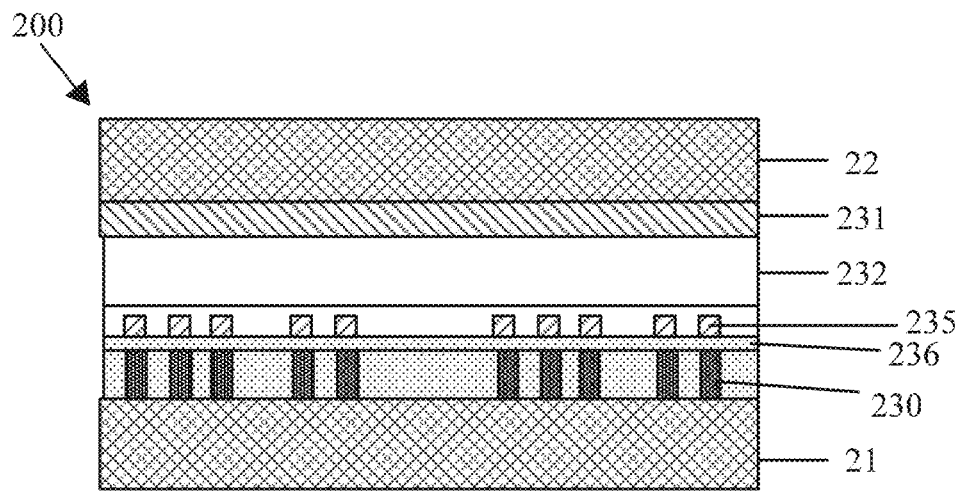
FIG. 5 schematically illustrates a sectional view of the phased-array antenna along Line BB' in FIG. 3 according to an embodiment of the present disclosure.

FIG. 2 schematically illustrates an arrangement of a microstrip line of a phased-array antenna according to an embodiment of the present disclosure. FIG. 3 schematically illustrates an arrangement of a first electrode of a phased-array antenna according to an embodiment of the present disclosure. FIG. 4 and FIG. 5 respectively schematically illustrate sectional views of the phased-array antenna along Line AA' and Line BB' in FIG. 3 according to embodiments of the present disclosure.

The phased-array antenna provided by some embodiments of the present disclosure is described in detail below with reference to FIG. 2 to FIG. 5.

It is to be noted that, in some embodiments of the present disclosure, a phased-array element including 2×2 arrays is taken as an example for illustration. However, it is to be understood that the phased-array antenna provided by some embodiments of the present disclosure is also suitable for a phased-array antenna with other phased-array element arrangement, which may be set by those skilled in the art according to actual needs. In some embodiments of the present disclosure, a plurality of phased-array elements are arranged in n rows×m columns. In other embodiments of the present disclosure, a plurality of phased-array elements may also be arranged in a non-array form.

As shown in FIG. 2 to FIG. 5, the phased-array antenna 200 provided by some embodiments of the present disclosure includes a first substrate 21 and a second substrate 22 arranged oppositely each other, and a plurality of phased-array elements 23 located between the first substrate 21 and the second substrate 22, which are arranged for example in an array. In some embodiments of the present disclosure, at least one of the phased-array elements 23 includes a first electrode 235, a second electrode 231 arranged opposite to the first electrode 235, a voltage-controlled phase shift material 232 located between the first electrode 235 and the second electrode 231, and a microstrip line 230 located at a side of the first electrode 235 far away from the voltage-controlled phase shift material 232 and electrically insulated from the first electrode 235. In some embodiments of the present disclosure, the first electrode 235 is configured to receive a bias signal for controlling the voltage-controlled phase shift material 232, the second electrode 231 serves as a ground electrode, and the microstrip line 230 is configured to receive or transmit a transmission signal, such as a microwave signal.

In some embodiments of the present disclosure, the microstrip line 230 may receive or transmit a transmission signal. The voltage-controlled phase shift material 232 may serve as a transmission medium of the transmission signal. By providing a bias signal (e.g., a bias voltage) to the first electrode 235, an electric field is generated between the first electrode 235 and the second electrode 231. The electric field may change a dielectric constant of the voltage-controlled phase shift material 232, such that a change of a phase of the transmission signal transmitted in the voltage-controlled phase shift material 232, that is, a phase shift, may take place.

According to some embodiments of the present disclosure, by incorporating the first electrode 235 into each phased-array element 23, the bias signal (e.g., the bias voltage) and the transmission signal may be respectively provided to the first electrode 235 and the microstrip line 230. It is unnecessary to arrange a filter in the phased-array element 23 for preventing the interference of the bias signal among different phased-array elements. Therefore, the loss due to the filter may be reduced, and thus the antenna gain may be improved. In addition, according to the phased-array antenna provided by some embodiments of the present disclosure, no filter is used, and thus no volume space of the phased-array antenna is occupied by the filter, which may facilitate the integration of the phased-array antenna into other devices.

In some embodiments of the present disclosure, the voltage-controlled phase shift material 232 may include a liquid crystal material. However, the embodiments of the present disclosure are not limited thereto, and as an example, the voltage-controlled phase shift material 232 may also include a ferroelectric material.

In each phased-array element, the microstrip line 230 may be electrically insulated from the first electrode 235 by an insulation layer 236 located between the microstrip line 230 and the first electrode 235. As an example, the insulation layers 236 of different phased-array elements 23 may be formed integrally. In this way, when preparing the insulation layer 236, an insulation material may be deposited on a surface of the first electrode 235 of each phased-array element 23 without needing to further pattern the deposited insulation material. However, it is to be understood that the embodiments of the present disclosure are not limited thereto, and it is also feasible that the insulation layers 236 of different phased-array elements 23 are discontinuous.

In an exemplary embodiment, as shown in FIG. 3, the first electrodes 235 of different phased-array elements 23 are electrically isolated, so as to prevent mutual interference of bias signals of different phased-array elements 23. As shown in FIG. 2, the microstrip lines 230 in each column of phased-array elements 23 are formed to be continuous such that the transmission signal may be transmitted between the respective phased-array elements 23 in each column.

As shown in FIG. 4 and FIG. 5, in some embodiments of the present disclosure, an orthographic projection of the first electrode 235 on the first substrate 21 substantially overlaps an orthographic projection of the microstrip line 230 on the first substrate 21. That is, in some embodiments of the present disclosure, the first electrode 235 is arranged at a position substantially corresponding to a position of the microstrip line 230 in a direction perpendicular to the substrate.

As used herein, "overlap" or "substantial overlap" may include a case where an element/component A (e.g., an orthographic projection of the first electrode on the first substrate) completely overlaps an element/component B (e.g., an orthographic projection of the microstrip line on the first substrate). Further, a case where profiles of the orthographic projections of the first electrode and the microstrip line have a deviation within 10% compared to the case of complete overlap is the case of substantial overlap.

In an exemplary embodiment, the first electrode 235 and the microstrip line 230 may have the same shape, such as a spiral shape or a snakelike shape. With this configuration, when the first electrode 235 is manufactured, the same mask as the microstrip line 230 may be used, and it is unnecessary to provide a special mask for the first electrode 235, so the process may be simplified.

In some embodiments of the present disclosure, the second electrode 231 may be formed as a block electrode. Alternatively, the second electrodes 231 of different phased-array elements 23 are formed integrally to serve as ground electrodes of the respective phased-array elements 23.

The "formed integrally" described in the embodiments of the present disclosure may refer to forming a continuous structure in one film forming process, or may refer to that two structures may be separately manufactured, but eventually physically formed into a continuous structure without other objects therebetween.

Referring to FIG. 2 again, the phased-array antenna 200 may further include a feed interface 24 configured to transmit the transmission signal, and a power divider 25 configured to couple the feed interface 24 to the microstrip line 230 of the respective phased-array element 23. In this configuration, the transmission signal is fed to the power divider 25 by the feed interface 24, and then is distributed to the respective phased-array element 23 by the power divider 25.

In an exemplary embodiment, the power divider 25 and the microstrip line 230 may be arranged in a same layer, i.e., formed of a same film layer.

As used herein, the "arranged in a same layer" may include a case where the element/component A and the element/component B are formed by the same film layer, and may also include a case where there is equal distance from a specific reference object (such as a substrate) in the thickness direction.

The microstrip line 230 may be formed of metal. Due to a high conductivity of the metal, using the metal to form the microstrip line 230 may reduce signal loss.

Referring again to FIG. 3, the phased-array antenna 200 may further include a pin 26 located in a peripheral region of the phased-array antenna, and a wiring 27 coupling the pin 26 to the first electrode 235. With this configuration, a bias signal source (such as a bias voltage source) may be coupled to the pin 26, and the bias signal may be provided to the first electrode 235 through the wiring 25.

In an exemplary embodiment, the pin 26, the wiring 27, and the first electrode 235 may be arranged in a same layer, i.e., formed of a same film layer. Through this design, the pin 26, the wiring 27, and the first electrode 235 may be formed in one patterning process.

In some embodiments of the present disclosure, the first electrode 235 may be formed of any electrically conductive material. For example, a material forming the first electrode 235 may include but is not limited to metal or metal oxide.

Figure 6:
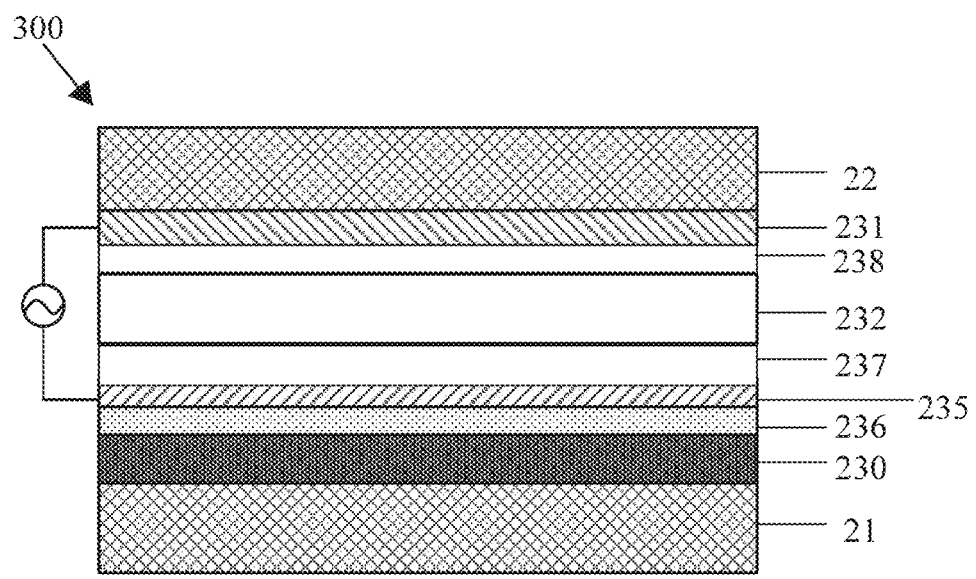
FIG. 6 schematically illustrates a sectional view of another phased-array antenna according to an embodiment of the present disclosure.

FIG. 6 schematically illustrates a sectional view of another phased-array antenna 300 according to an embodiment of the present disclosure. In the embodiment as shown in FIG. 6, the voltage-controlled phase shift material 232 includes a liquid crystal material. In addition to the components in the embodiments as shown in FIG. 2 to FIG. 5, the phased-array antenna 200 further includes a first alignment layer 237 located on a side of the first electrode 235 close to the voltage-controlled phase shift material 232, and a second alignment layer 238 located on a side of the second electrode 231 close to the voltage-controlled phase shift material 232. The first alignment layer 237 and the second alignment layer 238 may allow liquid crystal molecules to have a specific initial orientation. Materials and forming processes of the first alignment layer 237 and the second alignment layer 238 are not specifically limited in the embodiments of the present disclosure, and may be selected by those skilled in the art according to actual needs.

Figure 7:
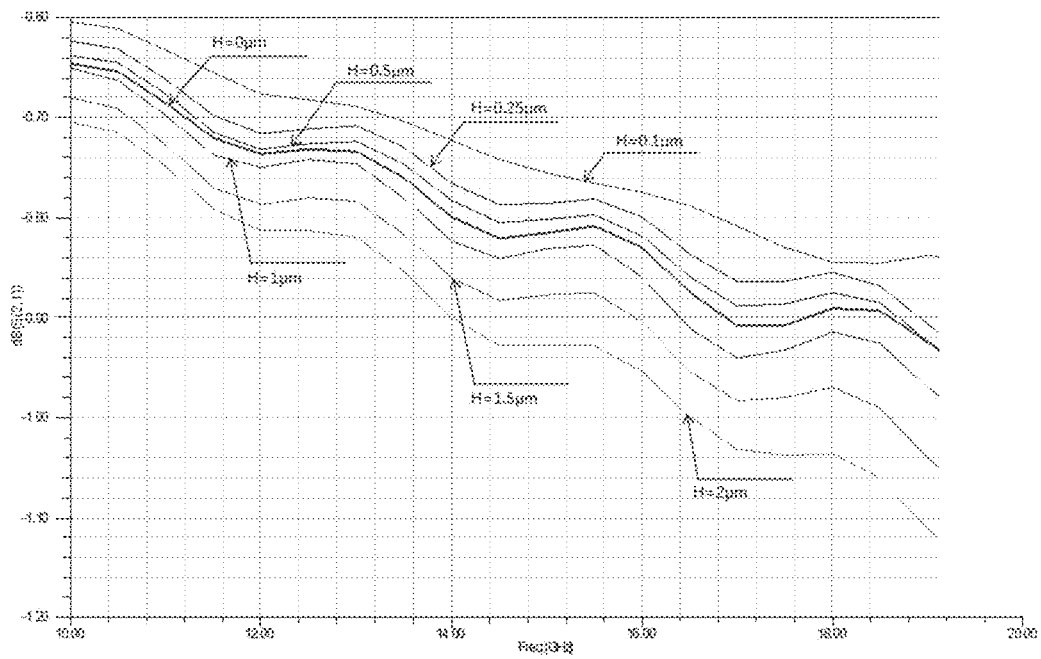
FIG. 7 illustrates a simulation result of a first electrode of a phased-array antenna with different thicknesses H according to an embodiment of the present disclosure.

FIG. 7 illustrates a simulation result of a first electrode of a phased-array antenna with different thicknesses H according to an embodiment of the present disclosure, wherein a horizontal axis represents a frequency of a transmission signal, and a vertical axis represents a loss of the phased-array antenna.

In operation, a model of the phased-array antenna according to an embodiment of the present disclosure may be established by simulation software. Specifically, following parameters may be assumed.

The first substrate and the second substrate are glass substrates with a dielectric constant of 5 and a thickness of 700 μm.

Electrode materials of the microstrip line and the second electrode are copper, wherein the microstrip line and the second electrode have a conductivity of 58,000,000 S/m, the microstrip line has a width of 200 μm, and the microstrip line has a length of 30 mm.

The insulation layer has a dielectric constant of 6.3 and has a thickness of 0.6 μm.

The conductivity of the first electrode is 300,000 S/m, and the thickness of the first electrode is a variable with a range of 0-2 μm.

The voltage-controlled phase shift material is a liquid crystal material, and a liquid crystal layer has a dielectric constant of 3 and has a thickness of 100 μm.

In FIG. 7, H=0 μm means that no first electrode is arranged in the phased-array antenna, and the phased-array antenna as shown in FIG. 1 is simulated.

As can be seen from the simulation result in FIG. 7, the thickness of the first electrode has an effect on the loss of the phased-array antenna. Under the above simulation conditions, when the thickness of the first electrode is less than 0.5 μm, the loss of the phased-array antenna according to some embodiments of the present disclosure is smaller than the loss of the phased-array antenna as shown in FIG. 1. However, when the thickness of the first electrode is greater than 0.5 μm, the loss of the phased-array antenna according to some embodiments of the present disclosure is greater than the loss of the phased-array antenna as shown in FIG. 1. Alternatively, when the phased-array antenna according to some embodiments of the present disclosure has the above parameters, the thickness H of the first electrode may be greater than about 0.01 μm and less than about 0.5 μm.

According to another aspect of the present disclosure, a display panel is further disclosed. Alternatively, the display panel may include at least one phased-array antenna according to the embodiments of the present disclosure, such as the at least one phased-array antenna according to one or more embodiments disclosed above in detail. Therefore, reference may be made to the embodiments of the phased-array antenna for the alternative embodiments of the display panel.

Figure 8:
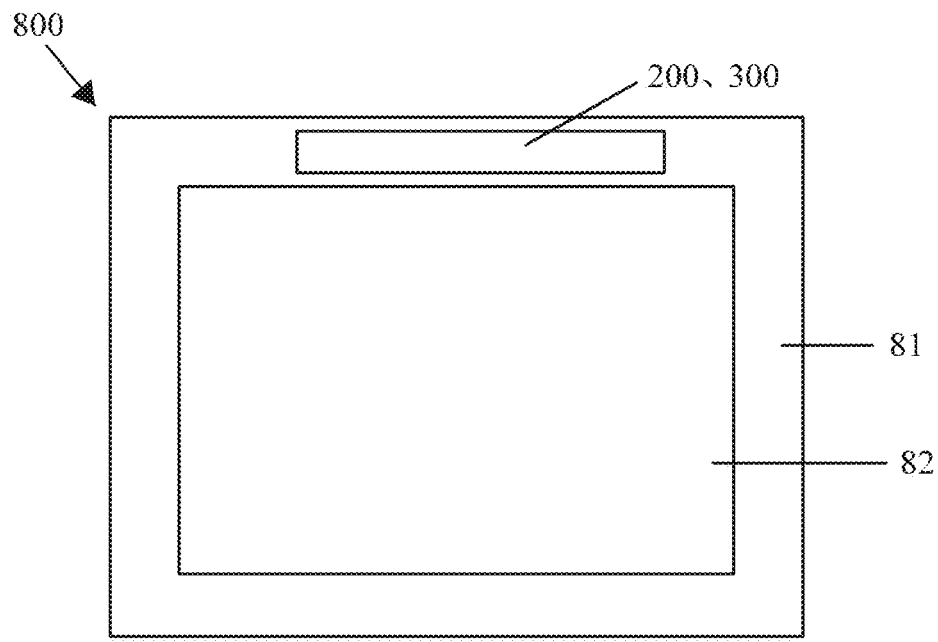
FIG. 8 schematically illustrates a plan view of a display panel according to an embodiment of the present disclosure.

FIG. 8 schematically illustrates a plan view of a display panel according to an embodiment of the present disclosure. As shown in FIG. 8, the display panel 800 may have a peripheral region 81 and a display region 82. The phased-array antennas 200 or 300 may be located in the peripheral region 81 of the display panel.

In an exemplary embodiment, the display panel 800 may be a liquid crystal display panel including a color filter substrate and an array substrate. The first substrate 20 described in the above embodiments relating to the phased-array antenna may serve as one of the color filter substrate and the array substrate, and the second substrate 30 may serve as the other of the color filter substrate and the array substrate. In some embodiments of the present disclosure, in the case that the voltage-controlled phase shift material of the phased-array antenna includes the liquid crystal material, the liquid crystal layer of the liquid crystal display panel may be formed integrally with the liquid crystal layer of the phased-array antenna.

In some embodiments of the present disclosure, other conventional elements or components required for the liquid crystal display panel may also be arranged on the color filter substrate and the array substrate. As an example, the color filter substrate may further include, but is not limited to, a first polarizer, an array-distributed color filter, and a black matrix for separating color filters from each other. The array substrate may include but is not limited to an array-distributed thin film transistor, a pixel electrode, and a second polarizer.

Figure 9:
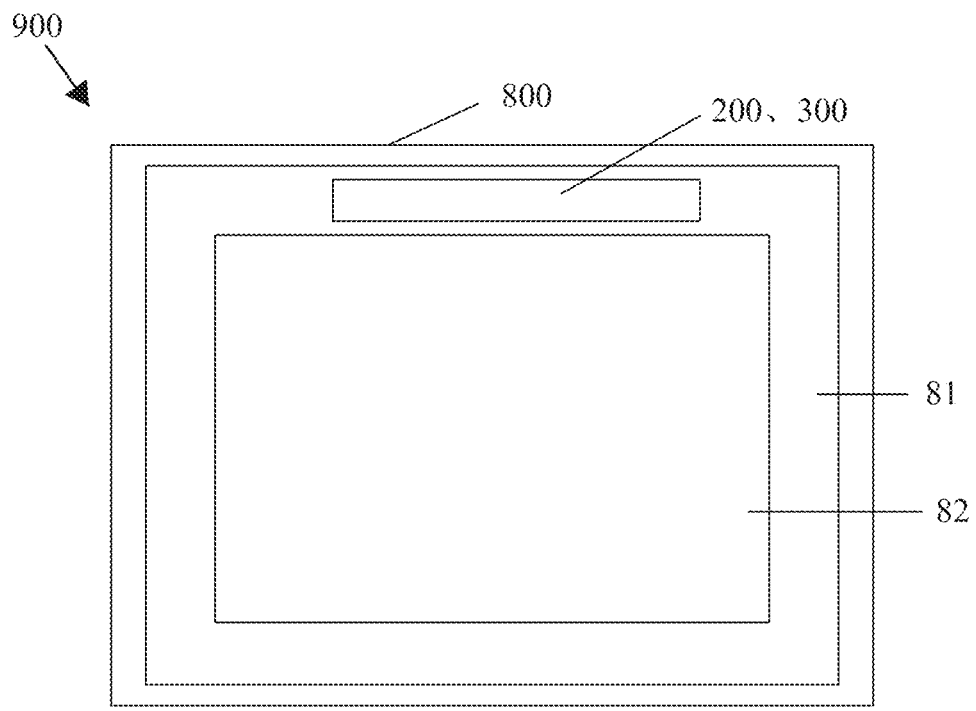
FIG. 9 schematically illustrates a plan view of a display device according to an embodiment of the present disclosure.

According to still another aspect of the present disclosure, a display device is further disclosed. FIG. 9 schematically illustrates a plan view of a display device 900 according to an embodiment of the present disclosure. As shown in FIG. 7, the display device may include the display panel 800 according to the embodiments of the present disclosure, such as the display panel 800 according to one or more embodiments disclosed above in detail. Therefore, for the alternative embodiments of the display device, reference may be made to the embodiments of the display panel 800, more specifically, to the embodiments of the phased-array antenna of the present disclosure.

The preceding description of the embodiments is provided for the purpose of illustration and description, and is not intended to be exhaustive or to limit the present disclosure. Various components or features of specific embodiments generally are not limited to specific embodiments. However, these components and features are interchangeable and may be used in selected embodiments even without specific illustration or description, where appropriate. Likewise, changes may be made in many ways. These changes are not deemed to depart from the present disclosure, and all these changes are included in the scope of the present disclosure.

What is claimed is:

1. A phased-array antenna comprising:
    a first substrate; and
    a plurality of phased-array elements arranged on the first substrate, wherein at least one of the plurality of phased-array elements comprises:
        a first electrode;
        a second electrode arranged opposite to the first electrode;
        a voltage-controlled phase shift material located between the first electrode and the second electrode, wherein the first electrode is configured to receive a bias signal for controlling the voltage-controlled phase shift material, and wherein the second electrode serves as a ground electrode; and
        a microstrip line located at a side of the first electrode far away from the voltage-controlled phase shift material and electrically insulated from the first electrode, wherein the microstrip line is configured to receive or transmit a transmission signal.

2. The phased-array antenna according to claim 1, wherein a thickness of the first electrode is greater than about 0.01 μm and less than about 0.5 μm.

3. The phased-array antenna according to claim 1, wherein an orthographic projection of the microstrip line on the first substrate overlaps an orthographic projection of the first electrode on the first substrate.

4. The phased-array antenna according to claim 1, wherein the first electrodes of different phased-array elements are electrically isolated.

5. The phased-array antenna according to claim 1, wherein each of the plurality of phased-array elements further comprises an insulation layer located between the microstrip line and the first electrode.

6. The phased-array antenna according to claim 1, wherein the first electrode and the microstrip line have a spiral or snakelike shape.

7. The phased-array antenna according to claim 1, wherein the second electrode comprises a block electrode.

8. The phased-array antenna according to claim 7, wherein the second electrodes of different phased-array elements are formed integrally.

9. The phased-array antenna according to claim 1, further comprising a feed interface configured to transmit the transmission signal, and a power divider configured to couple the feed interface to the microstrip line of the respective phased-array element.

10. The phased-array antenna according to claim 9, wherein the power divider and the microstrip line are arranged in a same layer.

11. The phased-array antenna according to claim 1, further comprising a pin located in a peripheral region of the phased array and a wiring coupling the pin to the first electrode.

12. The phased-array antenna according to claim 11, wherein the pin, the wiring, and the first electrode are arranged in a same layer.

13. The phased-array antenna according to claim 1, wherein the voltage-controlled phase shift material comprises a liquid crystal material.

14. The phased-array antenna according to claim 1, further comprising a second substrate, the plurality of phased-array elements arranged between the first substrate and the second substrate.

15. The phased-array antenna according to claim 14, further comprising a first alignment layer located on a side of the first electrode close to the voltage-controlled phase shift material, and a second alignment layer located on a side of the second electrode close to the voltage-controlled phase shift material.

16. The phased-array antenna according to claim 1, wherein a material of the first electrode comprises one or two of metal and metal oxide, and wherein a material of the microstrip line comprises metal.

17. A display panel comprising the phased-array antenna according to claim 1.

18. The display panel according to claim 17, wherein the phased-array antenna is located in a peripheral region of the display panel.

19. The display panel according to claim 17, wherein the display panel comprises a liquid crystal display panel having a color filter substrate and an array substrate, wherein the first substrate is one of the color filter substrate and the array substrate, and wherein the second substrate is the other of the color filter substrate and the array substrate.

20. A display device comprising the display panel according to claim 17.

* * * * *